US 8,780,239 B2

(12) United States Patent
Yamashita

(10) Patent No.: US 8,780,239 B2
(45) Date of Patent: Jul. 15, 2014

(54) IMAGE PICKUP APPARATUS AND SIGNAL VALUE CORRECTION METHOD

(71) Applicant: FUJIFILM Corporation, Tokyo (JP)

(72) Inventor: Hayato Yamashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/104,723

(22) Filed: Dec. 12, 2013

(65) Prior Publication Data

US 2014/0104465 A1    Apr. 17, 2014

Related U.S. Application Data

(63) Continuation of application No. PCT/JP2012/065833, filed on Jun. 21, 2012.

(30) Foreign Application Priority Data

Jul. 13, 2011    (JP) .................................. 2011-155136

(51) Int. Cl.
*H04N 5/335*    (2011.01)

(52) U.S. Cl.
CPC ...................................... *H04N 5/335* (2013.01)
USPC ............ 348/280; 348/272; 348/273; 348/277

(58) Field of Classification Search
CPC ........ H04N 5/335; H04N 5/357; H04N 5/359
See application file for complete search history.

(56) References Cited

U.S. PATENT DOCUMENTS

| 6,734,906 B1 | 5/2004 | Hashimoto |
| 6,956,605 B1 | 10/2005 | Hashimoto |
| 6,992,714 B1 | 1/2006 | Hashimoto et al. |
| 7,864,232 B2 * | 1/2011 | Kinoshita et al. ............. 348/272 |

(Continued)

FOREIGN PATENT DOCUMENTS

| JP | 2000-59697 A | 2/2000 |
| JP | 2000-78474 A | 3/2000 |

(Continued)

OTHER PUBLICATIONS

International Search Report issued in PCT/JP2012/065833, dated Sep. 11, 2012.
Written Opinion of the International Searching Authority issued in PCT/JP2012/065833, dated Sep. 11, 2012.

(Continued)

*Primary Examiner* — Lin Ye
*Assistant Examiner* — John H Morehead, III
(74) *Attorney, Agent, or Firm* — Birch, Stewart, Kolasch & Birch, LLP

(57) ABSTRACT

In an aspect of the present invention, only by storing the first correction coefficients corresponding to the colors of the color filters of the image pickup element and the second correction coefficients corresponding to the relative positions of the pixels to the position of the specific circuit element of the image pickup element, in the storage device, an adequate combination of the first correction coefficients and the second correction coefficients is selected for each pixel, and a calculation with it is performed with respect to the signal value of each of the pixels. Therefore, with an essential minimum number of correction coefficients, it is possible to quickly and accurately correct the variation in signal values caused by the color array for the color filters of the image pickup element and the variation in signal values caused by the structure in which multiple pixels share the specific circuit element.

13 Claims, 16 Drawing Sheets

(56) References Cited

U.S. PATENT DOCUMENTS

| | | | |
|---|---|---|---|
| 2005/0270412 A1* | 12/2005 | Kamon et al. | 348/362 |
| 2006/0119724 A1 | 6/2006 | Inuiya | |
| 2008/0278609 A1* | 11/2008 | Otsuki | 348/247 |
| 2010/0026862 A1* | 2/2010 | Nishiwaki | 348/246 |
| 2011/0273596 A1* | 11/2011 | Egawa | 348/241 |
| 2014/0044374 A1* | 2/2014 | Terasawa | 382/254 |

FOREIGN PATENT DOCUMENTS

| | | |
|---|---|---|
| JP | 2001-292453 A | 10/2001 |
| JP | 2006-165663 A | 6/2006 |
| JP | 2007-142697 A | 6/2007 |
| JP | 2008-288649 A | 11/2008 |

\* cited by examiner

IMAGE PICKUP APPARATUS AND SIGNAL VALUE CORRECTION METHOD

CROSS REFERENCE TO RELATED APPLICATIONS

This application is a Continuation of PCT International Application No. PCT/JP2012/065833 filed on Jun. 21, 2012, which claims priority under 35 U.S.C. §119(a) to Patent Application No. 2011-155136 filed in Japan on Jul. 13, 2011, all of which are hereby expressly incorporated by reference into the present application.

BACKGROUND OF THE INVENTION

1. Field of the Invention

The present invention relates to an image pickup apparatus and a signal value correction method that by a simple configuration make it possible to quickly and accurately correct the variation in signal values caused by a color array for color filters of an image pickup element and the variation in signal values caused by a structure in which multiple pixels share a specific circuit element.

2. Description of the Related Art

CMOS (Complementary Metal Oxide Semiconductor) image pickup elements exhibit low power consumption, and are used in a variety of portable image pickup apparatuses such as digital cameras and mobile phones.

In CMOS image pickup elements, a technique in which multiple pixels share a single amplifier is widely used as a technique for reducing the number of transistors required on the substrate.

In particular, an image pickup element that has color filters in a Bayer array (GR/BG) and a sharing structure for sharing a single amplifier on a 2×2 pixels basis, exhibits a good matching because the repetition period of the Bayer array (2×2) is equal to the repetition period of the amplifier sharing structure (2×2), and therefore, the image pickup element is very commonly used.

Japanese Patent Application Laid-Open No. 2008-288649 discloses a configuration in which correction is performed using a vertical-line correction parameter for multiple lines in view of an amplifier sharing pattern.

Japanese Patent Application Laid-Open No. 2000-78474 describes a CMOS image pickup element that achieves space saving by sharing an amplifier on a vertical 2×horizontal 2 pixel basis.

Japanese Patent Application Laid-Open No. 2007-142697 discloses a configuration in which four pixels around a pixel of interest separately have color-mixing correction parameters, in order to respond to the pixel-by-pixel difference of the color-mixing rate, resulting from the asymmetry of the aperture of each pixel.

SUMMARY OF THE INVENTION

In image pickup elements, typically, there is a problem in that the image quality of a picked-up image deteriorates due to the presence of a sensitivity ratio caused by the difference of the colors (for example, RGB) of color filters. Furthermore, there is also a problem in that a coloring on the peripheral part of the picked-up image or a fixed pattern noise appears because different sensitivity ratios are distributed in an image pickup surface even among the same color pixels. Hence, by dividing the image pickup surface into multiple regions and multiplying the signal value (output value) of each pixel by the reciprocal of the sensitivity ratio among the pixels for each region, it is possible to correct the sensitivity ratio among the pixels caused by the color of the color filter.

In a CMOS image pickup element with an amplifier sharing structure, a difference of signal values occurs depending on the relative positions of the pixels to the shared amplifier, even among the same color pixels in the same region. That is, there is a problem in that among the pixels at different relative positions to the shared amplifier, the sensitivities vary depending on differences of the substrate layouts and the like, resulting in an adverse effect on image reproducibility. This problem has become more conspicuous with the refinement of pixel size.

Hence, there can be conceived an idea of previously storing correction coefficients whose number (MN×MN) corresponds to the least common multiple of the repetition period (M×M) of a basic array pattern of the color filters and the repetition period (N×N) of an amplifier sharing structure, selecting an appropriate correction coefficient from them for each pixel, and multiplying the signal value of each pixel by the selected correction coefficient, in order to correct both the variation in signal values caused by a color array for the color filters of the image pickup element and the variation in signal values caused by a structure in which multiple pixels share a specific circuit element.

However, although only four correction coefficients are required if the color filters are arranged in the Bayer array of 2×2 and the amplifier sharing structure is a four pixel square array of 2×2, the number of correction coefficients (MN×MN) becomes enormous, for example, if the color filter array is an array of 3×3 or 6×6. Therefore, there is a problem of an increase in correction processing time and circuit size.

The configuration described in Japanese Patent Application Laid-Open No. 2008-288649 cannot be applied to the correction of the sensitivity ratio among the pixels caused by the variation in optical characteristics of the amplifier sharing structure, because of the use of light shielding pixels.

The configurations described in Japanese Patent Application Laid-Open No. 2000-78474 and Japanese Patent Application Laid-Open No. 2007-142697 result in a problem in that when the repetition arrangement period of the color filters is different from the repetition arrangement period of the amplifier sharing structure, the correction coefficients enormously increase.

In addition, since in the Bayer array, green (G) pixels are arranged in a plaid pattern (checkerboard pattern) and red (R) and blue (B) pixels are arranged line-sequentially, there is a problem in that a low-frequency coloring (color moire) occurs by a folding of high-frequency signals beyond the reproduction band for the colors and a deviation of the phase for the colors. Therefore, a configuration that can accurately and easily correct the sensitivity ratio even if the color filter array is other than the Bayer array is desired.

The present invention has been made in view of such circumstances, and has an object to provide an image pickup apparatus and a signal value correction method that by a simple configuration make it possible to quickly and accurately correct the variation in signal values caused by a color array for color filters of an image pickup element and the variation in signal values caused by a structure in which multiple pixels share a specific circuit element.

To achieve the object, the present invention provides an image pickup apparatus including an image pickup element in which a plurality of color filters are respectively arranged on a plurality of pixels arrayed two-dimensionally in a horizontal direction and a vertical direction, each of the pixels including a photoelectric conversion element; a storage device that stores information for correcting a signal value of each of the pixels of the image pickup element; and a correction device that corrects the signal value of each of the pixels of the image pickup element using the information stored in the storage device, in which the plurality of the pixels of the image pickup element share a specific circuit element on a multiple-pixel basis; the plurality of the color filters of the image pickup element are arranged such that a basic array pattern is repeated in the horizontal direction and the vertical direction, the basic array pattern mixedly including three or more color types of the color filters and having an arrangement period different from an arrangement period of a sharing structure pattern including the specific circuit element and the multiple pixels; the storage device stores a plurality of first correction coefficients and a plurality of second correction coefficients, the plurality of the first correction coefficients respectively corresponding to colors of the plurality of the color filters of the image pickup element, the plurality of the second correction coefficients respectively corresponding to a plurality of relative positions of the pixels to a position of the specific circuit element of the image pickup element; and when the correction device targets each of the plurality of the pixels of the image pickup element and corrects the signal value of each pixel of interest, the correction device selects a first correction coefficient corresponding to the color of the color filter on the pixel of interest from the plurality of the first correction coefficients stored in the storage device, selects a second correction coefficient corresponding to the relative position of the pixel of interest from the plurality of the second correction coefficients stored in the storage device, and performs a calculation with the selected first correction coefficient and the selected second correction coefficient, with respect to the signal value of the pixel of interest.

That is, only by storing the first correction coefficients corresponding to the colors of the color filters of the image pickup element and the second correction coefficients corresponding to the relative positions of the pixels to the position of the specific circuit element of the image pickup element, in the storage device, an adequate combination of the first correction coefficients and the second correction coefficients is selected for each pixel, and a calculation with it is performed with respect to the signal value of each of the pixels. Therefore, with an essential minimum number of correction coefficients, it is possible to quickly and accurately correct the variation in signal values caused by the color array for the color filters of the image pickup element and the variation in signal values caused by the structure in which multiple pixels share the specific circuit element.

In an embodiment, the storage device stores a sensitivity-ratio correction coefficient for correcting a sensitivity ratio among the pixels, and a color-mixing correction coefficient for correcting a color mixing of the color filter on an adjacent pixel that is adjacent to each of the pixels, the sensitivity-ratio correction coefficient and the color-mixing correction coefficient including the first correction coefficient and the second correction coefficient. The correction device performs a calculation with the first correction coefficient and the second correction coefficient for one of the sensitivity-ratio correction coefficient and the color-mixing correction coefficient, with respect to the signal value of the pixel of interest, and then performs a calculation with the first correction coefficient and the second correction coefficient for the other of the sensitivity-ratio correction coefficient and the color-mixing correction coefficient, with respect to the calculation result. That is, as a first step correction, a calculation with the first correction coefficient and the second correction coefficient for one of the sensitivity-ratio correction coefficient and the color-mixing correction coefficient (for the sensitivity-ratio correction coefficient, for example) is performed with respect to the signal value of each pixel of interest, and then as a second step correction, a calculation with the first correction coefficient and the second correction coefficient for the other of the sensitivity-ratio correction coefficient and the color-mixing correction coefficient (for the color-mixing correction coefficient, for example) is performed with respect to the calculation result. Therefore, it is possible to correct the signal value of the pixel more accurately than conventional image pickup apparatuses.

In an embodiment, the image pickup apparatus further includes a correction-coefficient calculation device that calculates the second correction coefficient, the correction-coefficient calculation device calculating the second correction coefficient by comparing the signal values among the pixels that have different relative positions to the position of the specific circuit element, in which the storage device stores the second correction coefficient calculated by the correction-coefficient calculation device. That is, it is possible to determine the correction coefficient for the sensitivity ratio by a factor of the amplifier sharing structure, separately from the correction coefficient for the sensitivity ratio by a factor of the color filters.

In an embodiment, in a whole or a part of a picked-up image generated by the image pickup element, the correction-coefficient calculation device calculates the second correction coefficient by calculating an average value of the signal values of a plurality of the same color pixels over a plurality of the sharing structure patterns, for each of the relative positions to the position of the specific circuit element, and comparing the average values among the relative positions that are different from each other. That is, it is possible to easily adapt the sensitivity-ratio correction coefficient according to a change in photographing environment, such as a change in incidence angle by a lens exchange.

In an embodiment, the image pickup element includes a white color filter in the basic array pattern, and the correction-coefficient calculation device calculates the second correction coefficient by averaging the signal values of the pixels corresponding to the white color filter over a plurality of the basic array patterns. That is, it is possible to accurately determine the correction coefficient by utilizing the good sensitivity characteristic of white pixels.

Furthermore, the present invention provides a signal value correction method to correct a signal value of each pixel of an image pickup element in which a plurality of color filters are respectively arranged on a plurality of pixels arrayed two-dimensionally in a horizontal direction and a vertical direction, each of the pixels including a photoelectric conversion element, in which the plurality of the pixels of the image pickup element share a specific circuit element on a multiple-pixel basis; the plurality of the color filters of the image pickup element are arranged such that a basic array pattern is repeated in the horizontal direction and the vertical direction, the basic array pattern mixedly including three or more color types of the color filters and having an arrangement period different from an arrangement period of a sharing structure pattern including the specific circuit element and the multiple pixels; and the method includes, previously storing a plurality of first correction coefficients and a plurality of second correction coefficients in a storage device, the plurality of the first correction coefficients respectively corresponding to colors of the plurality of the color filters of the image pickup element, the plurality of the second correction coefficients respectively corresponding to a plurality of relative positions of the pixels to a position of the specific circuit element of the image pickup element; and, when targeting each of the plurality of the pixels of the image pickup element and correcting the signal value of each pixel of interest, selecting a first correction coefficient corresponding to the color of the color filter on the pixel of interest from the plurality of the first correction coefficients, selecting a second correction coefficient corresponding to the relative position of the pixel of interest from the plurality of the second correction coefficients, and performing a calculation with the selected first correction coefficient and the selected second correction coefficient, with respect to the signal value of the pixel of interest.

In accordance with the present invention, by a simple configuration, it is possible to quickly and accurately correct the variation in signal values caused by a color array for color filters of an image pickup element and the variation in signal values caused by a structure in which multiple pixels share a specific circuit element.

DETAILED DESCRIPTION OF THE EMBODIMENTS

Hereinafter, embodiments of the present invention are described in detail with reference to the accompanying drawings.

First Embodiment

Figure 1:
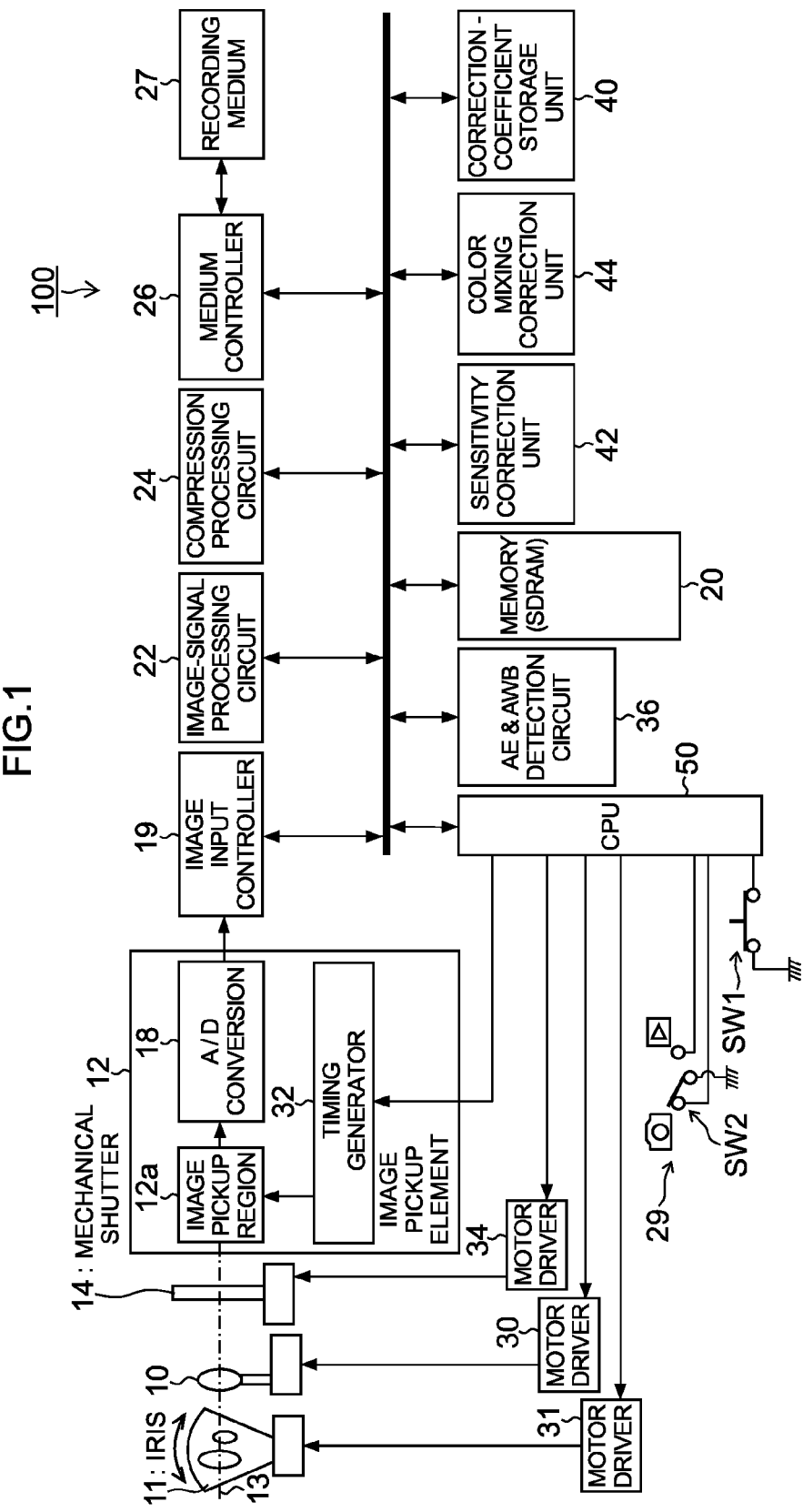
FIG. 1 is a block diagram showing an overall configuration of an exemplary image pickup apparatus according to a first embodiment.

FIG. 1 is a block diagram showing an overall configuration of an exemplary image pickup apparatus according to a first embodiment of the present invention. Here, examples of the image pickup apparatus are not limited to an independent camera, but can include a variety of information equipment and electric equipment, such as a camera-equipped mobile phone, a camera-equipped smart phone, a camera-equipped tablet computer and a camera-equipped music player.

An image pickup apparatus 100 includes a photographing lens 10 to form an object image from incident object light, an iris 11, an image pickup element 12 to pick up the object image formed by the photographing lens 10, a mechanical shutter 14 to switch between a light-shielding state and light-exposing state of the image pickup element 12 by opening and closing an optical path 13 for the object light that extends from the photographing lens 10 to the image pickup element 12, an image input controller 19 to input image signals, which are output from the image pickup element 12, to a memory 20, the memory 20 to temporarily store digital image signals, an image-signal processing circuit 22 to perform a predetermined digital signal process for the digital image signals temporarily stored in the memory 20, a compression processing circuit 24 to perform a compression process and an expansion process for the digital image signals, a medium controller 26 to perform an input and output of the digital image data, a recording medium 27 to which the compressed digital image signals are recorded as a picked-up image by the control of the medium controller 26, an instruction input unit 29 to which various instructions are input, a motor driver 30 to drive the photographing lens 10, a motor driver 31 to drive the iris 11, and a motor driver 34 to drive the mechanical shutter 14.

Figure 2:
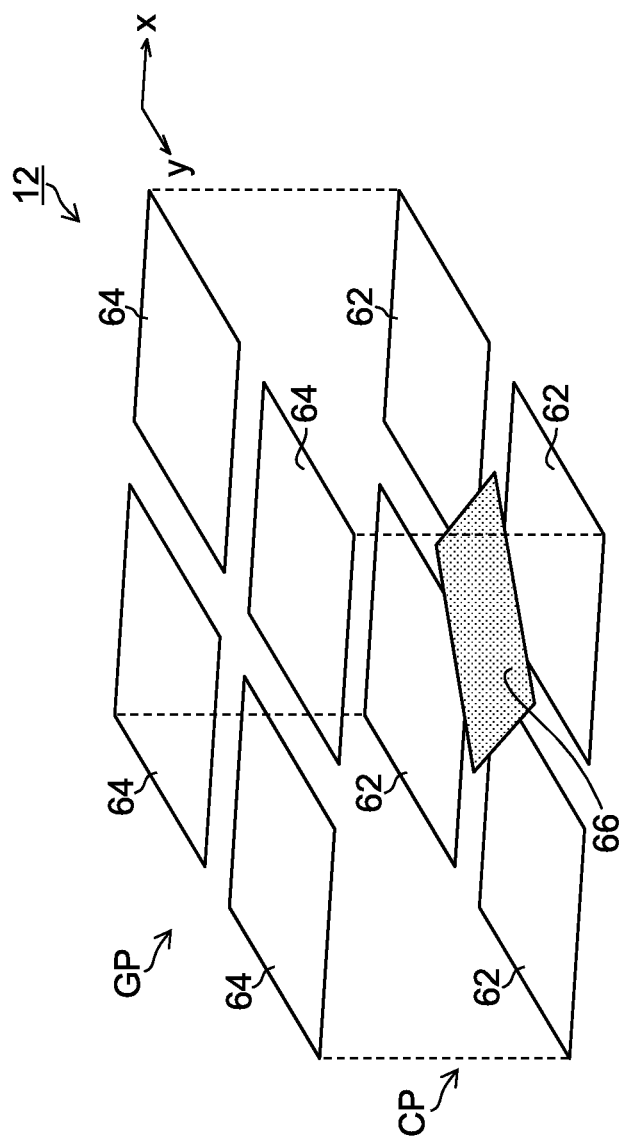
FIG. 2 is a schematic diagram showing a part of an exemplary image pickup element according to the first embodiment.
Figure 3:
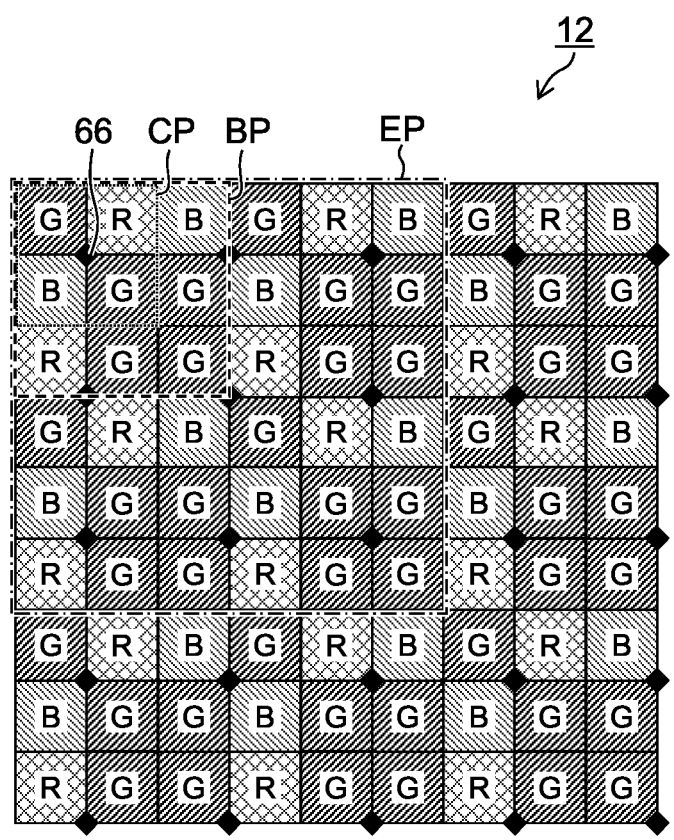
FIG. 3 is a diagram showing an exemplary color filter array of the image pickup element.

The image pickup element 12 is constituted by a CMOS (Complementary Metal Oxide Semiconductor) image pickup element. The structure of specific 2×2 pixels, which is a part of the image pickup element 12, is schematically shown in FIG. 2. This image pickup element 12 has a configuration in which a plurality of color filters 64 are respectively arranged on a plurality of pixels 62 that each include a photoelectric conversion element and that are arrayed two-dimensionally in the horizontal direction x and the vertical direction y. The plurality of pixels 62 share an amplifier 66 (amplifying element) as a specific circuit element, on a 2×2 pixel basis. As shown in FIG. 3, the plurality of color filters 64 are arranged such that a basic array pattern BP, which is composed of 3×3 pixels and in which three or more color types of color filters 64 (in the embodiment, three colors of R, G and B) are mixedly arrayed, is repeated in the horizontal direction x and the vertical direction y. A sharing structure pattern CP is composed of 2×2 pixels that share the amplifier 66. The array number as the least common multiple of the array number (3×3) in the basic array pattern BP and the array number (2×2) in the sharing structure pattern CP is 6×6. In the figure, reference character EP is put for the 6×6 extended pattern. In the extended pattern EP, the number of combinations of the colors of the color filters and the relative positions to the shared amplifier 66 is 36.

The image pickup element 12 includes an AD conversion unit 18 to convert analog image signals, which are output from an image pickup region 12a, into digital image signals, and a timing generator 32 to generate image pickup timing of the image pickup region 12a.

The object image formed on the image pickup element 12 by the photographing lens 10 is converted into signal charges depending on the quantity of incident light, by the photoelectric conversion element constituting the pixel 62 of the image pickup element 12. The signal charges accumulated in each photoelectric conversion element are sequentially read from the image pickup element 12 as voltage signals (image signals) depending on the quantity of the signal charges, based on driving pulses given from the timing generator 32 according to an instruction of a CPU 50. The image signals to be read from the image pickup element 12 are image signals of R, G and B corresponding to the color filter array of the image pickup element 12.

The digital image signals output from the image pickup element 12 are temporarily stored in the memory 20, by the control of the image input controller 19. To the temporarily-stored digital image signals, the image-signal processing circuit 22 performs various digital signal processes, such as white balance correction, gamma correction, generation of luminance signals and color-difference signals, contour correction, and color correction. The image signals to which such digital signal processes are performed, are recorded in the recording medium 27 such as a memory card by the medium controller 26, after a compression process conforming to the JPEG standard or the like by the compression processing circuit 24.

The image pickup apparatus 100 includes a correction-coefficient storage unit 40 to store correction coefficients for correcting the signal value of each pixel of the image pickup element 12, a sensitivity correction unit 42 to perform a sensitivity correction using the correction coefficients stored in the correction-coefficient storage unit 40, a color-mixing correction unit 44 to perform a color-mixing correction using the correction coefficients stored in the correction-coefficient storage unit 40, and the CPU 50 to control each unit of the image pickup apparatus 100. The correction-coefficient storage unit 40 is constituted by, for example, a nonvolatile memory. Each of the sensitivity correction unit 42 and color-mixing correction unit 44 is constituted by, for example, an arithmetic circuit. The sensitivity correction unit 42 and the color-mixing correction unit 44 may be included in the CPU 50.

The correction-coefficient storage unit 40 stores a plurality of first correction coefficients that respectively correspond to the colors of the plurality of color filters 64 of the image pickup element 12, and a plurality of second correction coefficients that respectively correspond to a plurality of relative positions of the pixels 62 to the position of the shared amplifier 66 of the image pickup element 12. In the embodiment, the correction-coefficient storage unit 40 is constituted by a nonvolatile memory. The correction-coefficient storage unit 40 according to the embodiment, as the plurality of first correction coefficients, stores as many first correction coefficients as the types of the color filters 64 of the image pickup element 12, which are different from each other in spectral characteristic. Furthermore, the correction-coefficient storage unit 40 according to the embodiment, as the plurality of second correction coefficients, stores as many second correction coefficients as the pixels existing in one unit of the sharing structure pattern CP of the image pickup element 12.

The CPU 50 controls the sensitivity correction unit 42 and the color-mixing correction unit 44, and thereby controls the correction of the signal value that is output from each pixel of the image pickup element 12.

[Principle of Signal Value Correction According to the Present Invention]

Next, the principle of the signal value correction according to the present invention is described.

When targeting each of the plurality of pixels 62 of the image pickup element 12 and correcting the signal value of each pixel of interest, the sensitivity correction unit 42 and the color-mixing correction unit 44 select a first correction coefficient, which corresponds to the color of the color filter 64 on the pixel of interest, from the plurality of first correction coefficients stored in the correction-coefficient storage unit 40, select a second correction coefficient, which corresponds to the relative position of the pixel of interest to the shared amplifier 66, from the plurality of second correction coefficients stored in the correction-coefficient storage unit 40, and perform a calculation with the selected first correction coefficient and the selected second correction coefficient, with respect to the signal value of the pixel of interest. Therefore, with an essential minimum number of correction coefficients, it is possible to quickly and accurately correct the variation in signal values caused by the color array for the color filters 64 of the image pickup element 12 and the variation in signal values caused by the structure in which the multiple pixels share the amplifier 66.

As a first step of the signal value correction, the sensitivity correction unit 42 performs a calculation with the first and second correction coefficients for the sensitivity-ratio correction coefficient, with respect to the signal value of the pixel of interest. As a second step of the signal value correction, with respect to the calculation result by the sensitivity correction unit 42, the color-mixing correction unit 44 performs a calculation with the first and second correction coefficients for the color-mixing correction coefficient. Therefore, it is possible to correct the signal value of the pixel more accurately than conventional image pickup apparatuses. As a first step of the signal value correction, the color-mixing correction unit 44 may perform a calculation with the first and second correction coefficients for the color-mixing correction coefficient with respect to the signal value of the pixel of interest, and then as a second step of the signal value correction, the sensitivity correction unit 42 may perform a calculation with the first and second correction coefficients for the sensitivity-ratio correction coefficient with respect to the calculation result by the color-mixing correction unit 44.

[Exemplary Signal Value Correction According to the First Embodiment]

Figure 4:
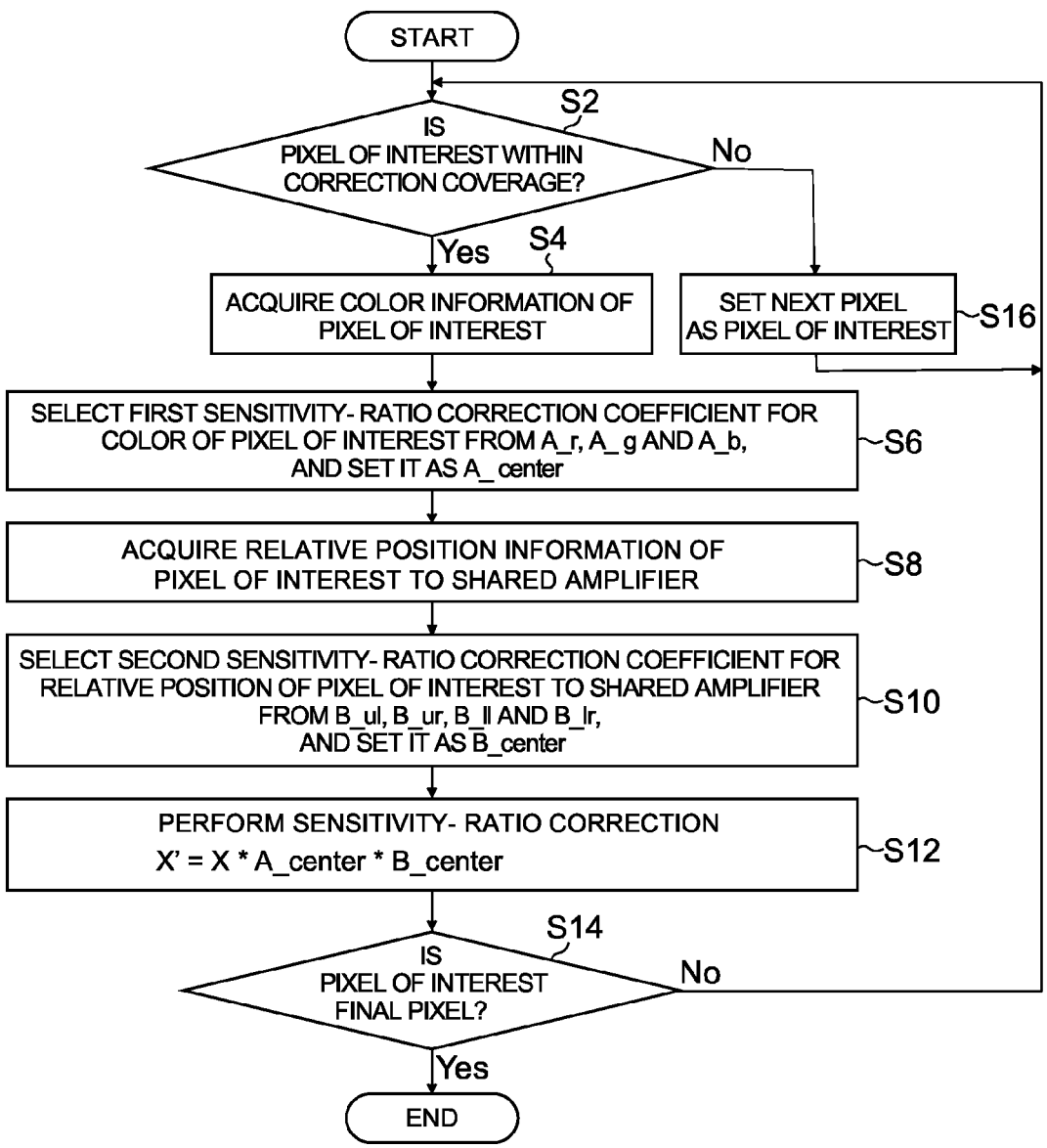
FIG. 4 is a flowchart showing a flow of an exemplary sensitivity correction process according to the first embodiment.

FIG. 4 is a flowchart showing a flow of an exemplary sensitivity-ratio correction process according to the first embodiment. The process is executed according to a program under the control of the CPU 50 in FIG. 1. The CPU 50 targets each of the plurality of pixels of the image pickup element 12 and corrects the sensitivity ratio among the pixels, with the sensitivity correction unit 42.

First, the CPU 50 determines whether the pixel of interest is within a correction coverage (step S2). The correction coverage, which is non-limiting, is for example, an effective pixel region. In the case of being within the correction coverage, steps S4 to S12 are executed.

The CPU 50 acquires the color information of the pixel of interest (step S4). In the embodiment, the image pickup element 12 includes the color filters with three colors of R, G and B, and the CPU 50 acquires the information about which color filter of R, G and B is on the pixel of interest. The color information of each pixel is stored in, for example, the memory 20, and the color information is acquired therefrom.

From a plurality of first sensitivity-ratio correction coefficients A_r, A_g and A_b that are stored in the correction-coefficient storage unit 40, the sensitivity correction unit 42 selects a correction coefficient corresponding to the color of the color filter on the pixel of interest, and sets it as A_center (step S6). Here, the A_r, A_g and A_b are correction coefficients corresponding to the colors of the color filters, and in the embodiment, correction coefficients corresponding to R, G and B, respectively. That is, of the A_r, A_g and A_b stored in the correction-coefficient storage unit 40, the correction coefficient for the color of the color filter corresponding to the pixel of interest is acquired from the correction-coefficient storage unit 40.

Next, for the pixel of interest, the CPU 50 acquires the relative position information to the position of the shared amplifier 66 (step S8). In the embodiment, a single shared amplifier 66 is shared by four pixels of 2×2 (upper left, upper right, lower left and lower right), and the CPU 50 acquires the information about which position of upper left, upper right, lower left and lower right is the position of the pixel of interest relative to the shared amplifier 66. For example, the relative position information is stored in the correction-coefficient storage unit 40, as the information about the relative positions of the pixels to the shared amplifier 66.

From second sensitivity-ratio correction coefficients B_ul, B_ur, B_ll and B_lr that are stored in the correction-coefficient storage unit 40, the sensitivity correction unit 42 selects one corresponding to the relative position of the pixel of interest to the shared amplifier 66, and sets it as B_center (step S10). Here, the B_ul, B_ur, B_ll and B_lr, which are correction coefficients corresponding to the relative positions of the pixel of interest to the shared amplifier 66, are sensitivity-ratio correction coefficients in the case where the pixel of interest is an upper left pixel, upper right pixel, lower left pixel and lower right pixel relative to the corresponding shared amplifier 66, respectively.

Next, the sensitivity correction unit 42 executes a sensitivity-ratio correction (step S12). In the embodiment, the following formula is executed.

$$X' = X * A\_center * B\_center$$

Here, X represents the signal value of each pixel before the sensitivity-ratio correction, X' represents the signal value of each pixel after the sensitivity-ratio correction, and "*" represents multiplication. That is, the sensitivity correction unit 42 multiplies the signal value of the pixel of interest by the first sensitivity-ratio correction coefficient corresponding to the color of the color filter, A_center, and the second sensitivity-ratio correction coefficient corresponding to the relative position to the position of the shared amplifier 66, B_center.

After the execution of steps S4 to S12, the CPU 50 determines whether the pixel of interest is the final pixel in the correction coverage (step S14). The process returns to step S2 in the case of not being the final pixel, and ends in the case of being the final pixel.

In the case where the pixel of interest is not within the correction coverage (in step S2, No), the CPU 50 sets the next pixel as the pixel of interest (step S16).

Figure 5:
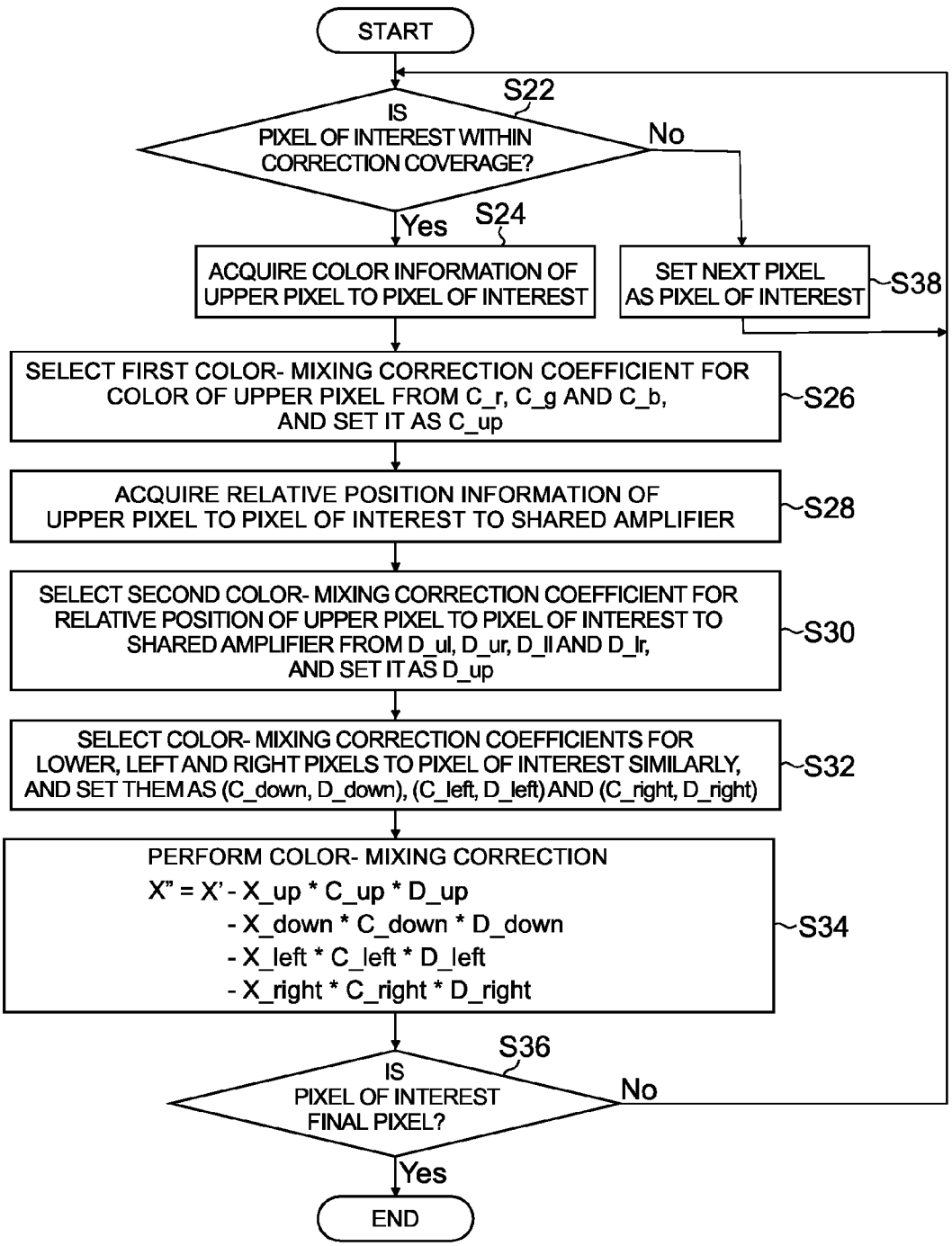
FIG. 5 is a flowchart showing a flow of an exemplary color-mixing correction process according to the first embodiment.

FIG. 5 is a flowchart showing a flow of an exemplary color-mixing correction process according to the first embodiment. The process is executed according to a program under the control of the CPU 50 in FIG. 1. The CPU 50 targets each of the plurality of pixels of the image pickup element 12 and corrects the color mixing of the color filter on an adjacent pixel to each pixel of interest, with the color-mixing correction unit 44.

First, the CPU 50 determines whether the pixel of interest is within the correction coverage (step S22). In the case of being within the correction coverage, the CPU 50 executes steps S24 to S34.

The CPU 50 acquires the color information of the upward adjacent pixel (upper pixel) to the pixel of interest (step S24). That is, the CPU 50 acquires the information about which color filter of R, G and B is on the upper pixel. The color information of each pixel is stored in, for example, the memory 20, and the CPU 50 acquires the color information therefrom.

From a plurality of first color-mixing correction coefficients C_r, C_g and C_b that are stored in the correction-coefficient storage unit 40, the color-mixing correction unit 44 selects a correction coefficient corresponding to the color of the color filter on the upper pixel, and sets it as C_up (step S26). Here, the C_r, C_g and C_b are correction coefficients corresponding to the colors of the color filters, and in the embodiment, correction coefficients corresponding to R, G and B, respectively. That is, the color-mixing correction unit 44 acquires, of the C_r, C_g and C_b stored in the correction-coefficient storage unit 40, the correction coefficient for the color of the color filter corresponding to the upper pixel, from the correction-coefficient storage unit 40.

Next, for the upward adjacent pixel (upper pixel) to the pixel of interest, the color-mixing correction unit 44 acquires the relative position information to the position of the shared amplifier 66 (step S28). In the embodiment, the color-mixing correction unit 44 acquires the information about which position of upper left, upper right, lower left and lower right is the position of the upper pixel relative to the shared amplifier 66.

Next, from second color-mixing correction coefficients D_ul, D_ur, D_ll and D_lr that are stored in the correction-coefficient storage unit 40, the CPU 50 selects a correction coefficient corresponding to the relative position (upper left, upper right, lower left or lower right) of the upper pixel to the shared amplifier 66, and sets it as D_up (step S30). Here, the D_ul, D_ur, D_ll and D_lr are correction coefficients corresponding to the relative positions of the upper pixel to a shared amplifier 66 that is shared by the upper pixel and other pixels (in some cases, this shared amplifier 66 is different from the shared amplifier 66 for the pixel of interest), and are color-mixing correction coefficients in the case where the upper pixel is an upper left pixel, upper right pixel, lower left pixel and lower right pixel relative to the shared amplifier 66 for the upper pixel, respectively.

Similarly to the C_up and D_up for the upper pixel, the CPU 50 selects color-mixing correction coefficients for the lower pixel (downward adjacent pixel), left pixel (leftward adjacent pixel) and right pixel (rightward adjacent pixel) to the pixel of interest (step S32).

The CPU 50 sets a correction coefficient corresponding to the color of the lower pixel as C_down, a correction coefficient corresponding to the relative position of the lower pixel to the shared amplifier 66 as D_down, a correction coefficient corresponding to the color of the left pixel as C_left, a correction coefficient corresponding to the relative position of the left pixel to the shared amplifier 66 as D_left, a correction coefficient corresponding to the color of the right pixel as C_right, and a correction coefficient corresponding to the relative position of the right pixel to the shared amplifier 66 as D_right.

Next, the color-mixing correction unit 44 executes a color-correction (step S34). In the embodiment, the following formula is executed.

$$X''=X'-X\_up*C\_up*D\_up-X\_down*C\_down*D\_down-X\_left*C\_left*D\_left-X\_right*C\_right*D\_right$$

Here, X' represents the signal value of the pixel of interest (target pixel) after the sensitivity-ratio correction, X_up represents the signal value of the upper pixel, X_down represents the signal value of the lower pixel, X_left represents the signal value of the left pixel, X_right represents the signal value of the right pixel, X" represents the signal value of the pixel of interest (target pixel) after the color-mixing correction, and "*" represents multiplication.

That is, the color-mixing correction unit 44 subtracts, from the target pixel signal value after the sensitivity-ratio correction X', the product resulting from multiplying the upper pixel signal value X_up by the color-mixing correction coefficients C_up and D_up, the product resulting from multiplying the lower pixel signal value X_down by the color-mixing correction coefficients C_down and D_down, the product resulting from multiplying the left pixel signal value X_left by the color-mixing correction coefficients C_left and D_left, and the product resulting from multiplying the right pixel signal value X_right by the color-mixing correction coefficients C_right and D_right. Thereby, the color-mixing correction unit 44 removes color-mixing components from the signal value of the target pixel.

After the execution of steps S14 to S34, the CPU 50 determines whether the pixel of interest is the final pixel in the correction coverage (step S36). The process returns to step S22 in the case of not being the final pixel, and ends in the case of being the final pixel.

In the case where the pixel of interest is not within the correction coverage (in step S22, No), the CPU 50 sets the next pixel as the pixel of interest (step S38).

With reference to FIGS. 4 and 5, the case in which the color-mixing correction is performed after the sensitivity-ratio correction has been described as an example. However, the present invention is not particularly limited to such a case, and the sensitivity-ratio correction may be performed after the color-mixing correction.

Second Embodiment

Figure 6:
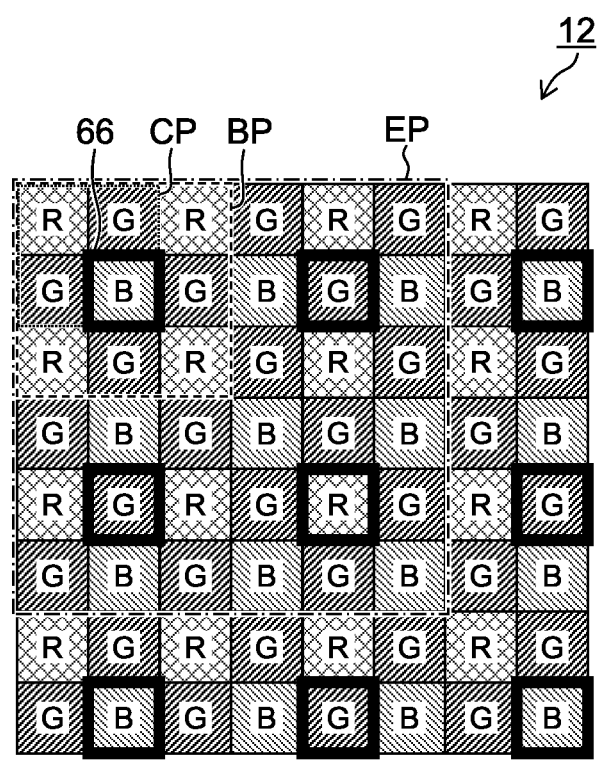
FIG. 6 is a schematic diagram showing a part of an exemplary image pickup element according to a second embodiment.

FIG. 6 is a schematic diagram showing a part of an exemplary image pickup element 12 according to a second embodiment. In the image pickup element 12 according to the embodiment, the array number in the basic array pattern BP (Bayer array) of color filters is 3×3, and the array number in the sharing structure pattern CP for a shared amplifier 66 is 2×2. Therefore, the array number as the least common multiple of the array number (3×3) in the basic array pattern BP of color filters and the array number (2×2) in the sharing structure pattern CP is 6×6. In the figure, reference character EP is put for the 6×6 extended pattern. In the extended pattern EP, the number of combinations of the colors of the color filters and the relative positions to the shared amplifier 66 is 36, and there is a need to manage 36 types of correction coefficients if the present invention is not applied.

The sensitivity-ratio correction can be performed similarly to the procedure shown in FIG. 4. The color-mixing correction can be performed similarly to the procedure shown in FIG. 5.

In the present invention, correction coefficients corresponding to the colors of the color filters and correction coefficients corresponding to the relative positions of the pixels to the shared amplifier 66 are stored in the correction-coefficient storage unit 40, and a calculation with these correction coefficients is performed with respect to the signal value of each pixel. That is, since the colors of the color filters come in 3 types (R, G, and B) and the relative positions to the shared amplifier 66 come in 9 types (upper left, top, upper right, left, center, right, lower left, bottom and lower right), the correction coefficients to be previously stored come in just 12 (=3+9) types when only the sensitivity-ratio correction is performed. Even when both the sensitivity-ratio correction and the color-mixing correction are performed similarly to the first embodiment, the correction coefficients come in just a small number of types.

Third Embodiment

Figure 7:
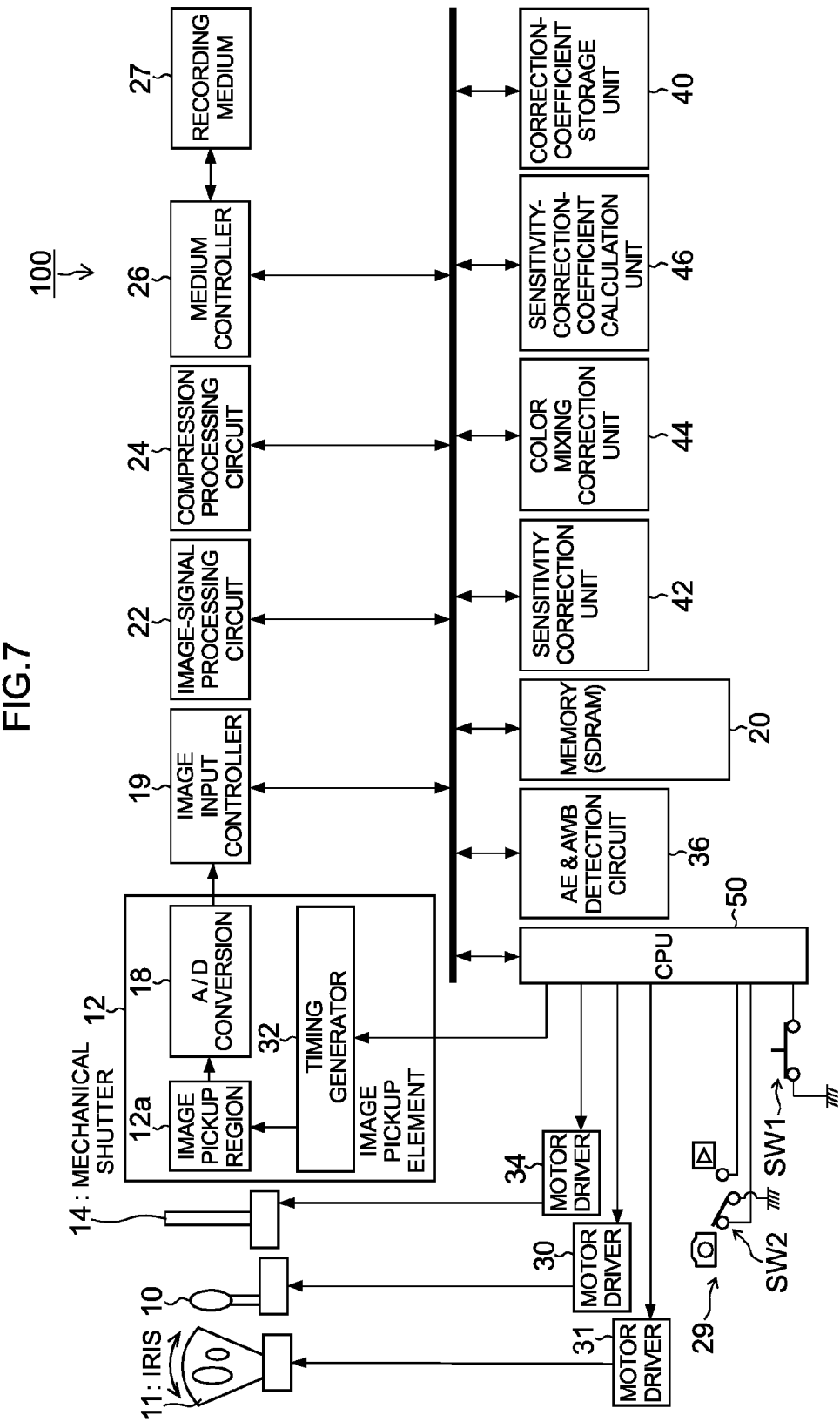
FIG. 7 is a block diagram showing an overall configuration of an exemplary image pickup apparatus according to the third embodiment.

FIG. 7 is a block diagram showing an exemplary image pickup apparatus according to a third embodiment. The image pickup apparatus 100 includes a sensitivity-correction-coefficient calculation unit 46 to calculate sensitivity correction coefficients for correcting sensitivity differences caused by the amplifier sharing structure. The other constituent elements are the same as the constituent elements in the first embodiment shown in FIG. 1, and descriptions thereof are omitted.

The sensitivity-correction-coefficient calculation unit 46 according to the embodiment calculates a sensitivity-ratio correction coefficient (the second sensitivity-ratio correction coefficient) for correcting a sensitivity difference caused by the amplifier sharing structure, by calculating an average value of the signal value of a plurality of the same color pixels over a plurality of the sharing structure patterns, for each of the relative positions to the position of the shared amplifier 66, and comparing the calculated average values among the relative positions that are different from each other.

Figure 8:
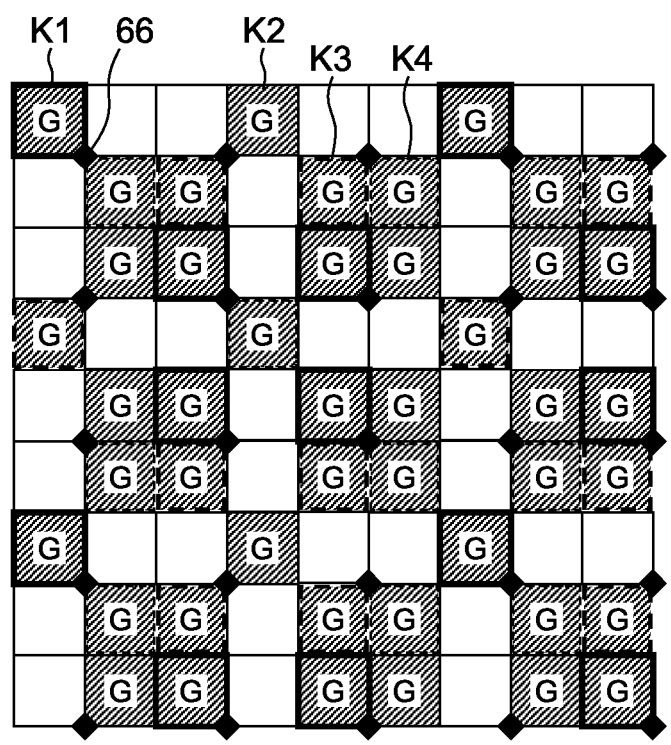
FIG. 8 is a schematic diagram showing a part of an exemplary image pickup element according to a third embodiment.

FIG. 8 is a schematic diagram showing a part of an exemplary image pickup element 12 according to the third embodiment, and shows a manner in which a plurality of G pixels are grouped by the relative position to the shared amplifier 66. In the figure, the pixels K1 positioned at the upper left of the shared amplifier 66 are grouped as A group (upper-left pixel group), the pixels K2 positioned at the upper right are grouped as B group (upper-right pixel group), the pixels K3 positioned at the lower left are grouped as C group (lower-left pixel group), and the pixels K4 positioned at the lower right are grouped as D group (lower-right pixel group).

Figure 9:
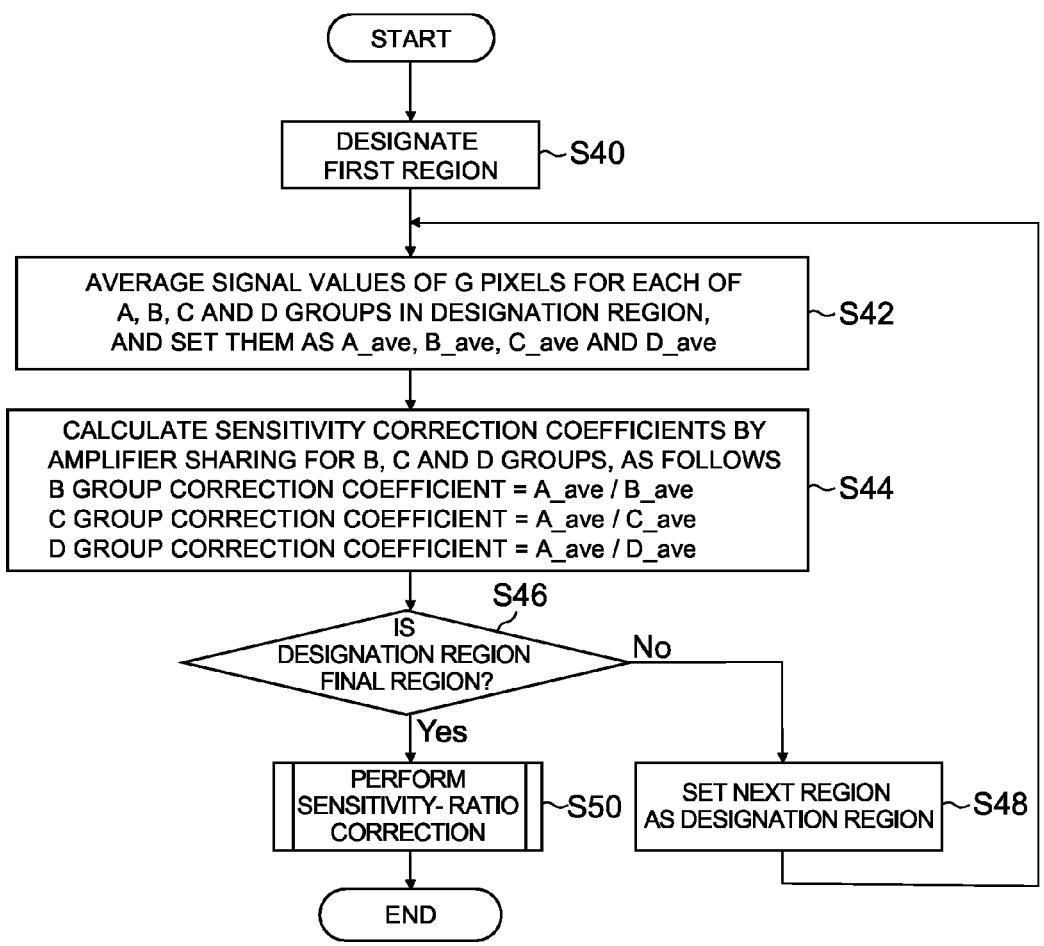
FIG. 9 is a flowchart showing a flow of an exemplary color-mixing correction process according to the third embodiment.

FIG. 9 is a flowchart showing a flow of an exemplary correction process according to the third embodiment. The process is executed according to a program under the control of the CPU 50 in FIG. 1.

First, the CPU 50 designates a first region (step S40).

The sensitivity-correction-coefficient calculation unit 46 averages the signal values of the G (green) pixels for each pixel group of the A group (upper-left pixel group), B group (upper-right pixel group), C group (lower-left pixel group) and D group (lower-right pixel group) in the designation region, and sets them as A_ave, B_ave, C_ave and D_ave respectively (step S42).

Next, the sensitivity-correction-coefficient calculation unit 46 calculates correction coefficients, A_ave/B_ave, A_ave/C_ave and A_ave/D_ave, for correcting sensitivity ratios caused by the amplifier sharing structures of the B, C and D groups (step S44). That is, in the embodiment, the sensitivity-correction-coefficient calculation unit 46 defines the average value of the signal values in the A group (upper-left pixel group) as the standard sensitivity, and calculates the reciprocals of the sensitivity ratios between the groups as the correction coefficients.

Next, the CPU 50 determines whether the designation region is the final region (step S46), and, in the case of not being the final region (in step S46, No), sets the next region as the designation region to repeat steps S42 to S44 (step S48).

After determining the sensitivity-ratio correction coefficients in all designation regions, the CPU 50 performs a sensitivity-ratio correction (step S50). This sensitivity-ratio correction is the same as the process according to the first embodiment, which has been previously described with reference to FIG. 4, and descriptions thereof are omitted here. The color-mixing correction according to the first embodiment shown in FIG. 5 may be performed together.

Although the sensitivity-ratio correction coefficients are determined on the basis of the signal values of G (green) pixels in the above description, the sensitivity-ratio correction coefficients may be determined on the basis of the signal values of pixels with another color such as R (red).

According to the embodiment, it is possible to calculate correction coefficients (amplifier-sharing sensitivity-ratio correction coefficients) for correcting the variation in sensitivity caused by an amplifier sharing structure, separately from correction coefficients (color mixing) for correcting the variation in sensitivity caused by color filters.

Furthermore, it is possible to determine the sensitivity-ratio correction coefficients caused by amplifier sharing, from a photographed image. This allows for elimination of a need to previously prepare a correction table and adaptation to a change in optical condition by a zooming operation, a lens exchange or the like.

Fourth Embodiment

Figure 10:
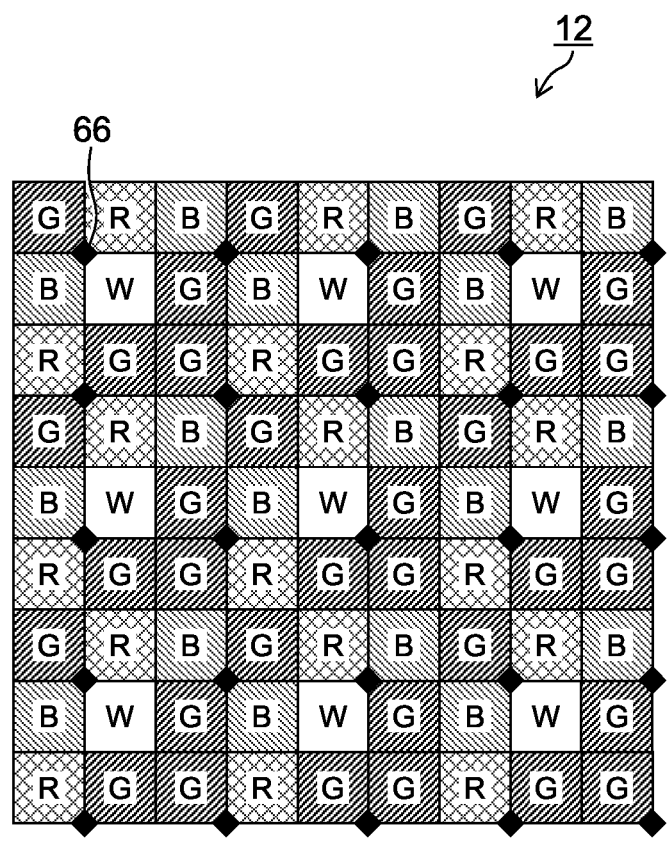
FIG. 10 is a schematic diagram showing a part of an exemplary image pickup element according to a fourth embodiment.

FIG. 10 is a schematic diagram showing a chief part of an exemplary image pickup element according to a fourth embodiment. In the image pickup element 12 according to the embodiment, the amplifier sharing structure is a 2×2 array, and the basic array of color filters is a 3×3 array. In the figure, reference character "R" designates a red color filter and pixel, reference character "G" designates a green color filter and pixel, reference character "B" designates a blue color filter and pixel, and reference character "W" designates a white color filter and pixel. That is, the image pickup element 12 according to the embodiment includes white pixels. The image pickup element 12*w* with white pixels can exhibit a higher sensitivity than the image pickup element 12 without white pixels, and therefore has an effect on luminance noise reduction.

In the embodiment, since the sharing structure pattern of the shared amplifier 66 is constructed by 2×2 pixels, the relative positions to the shared amplifier 66 come in four types.

Figure 11:
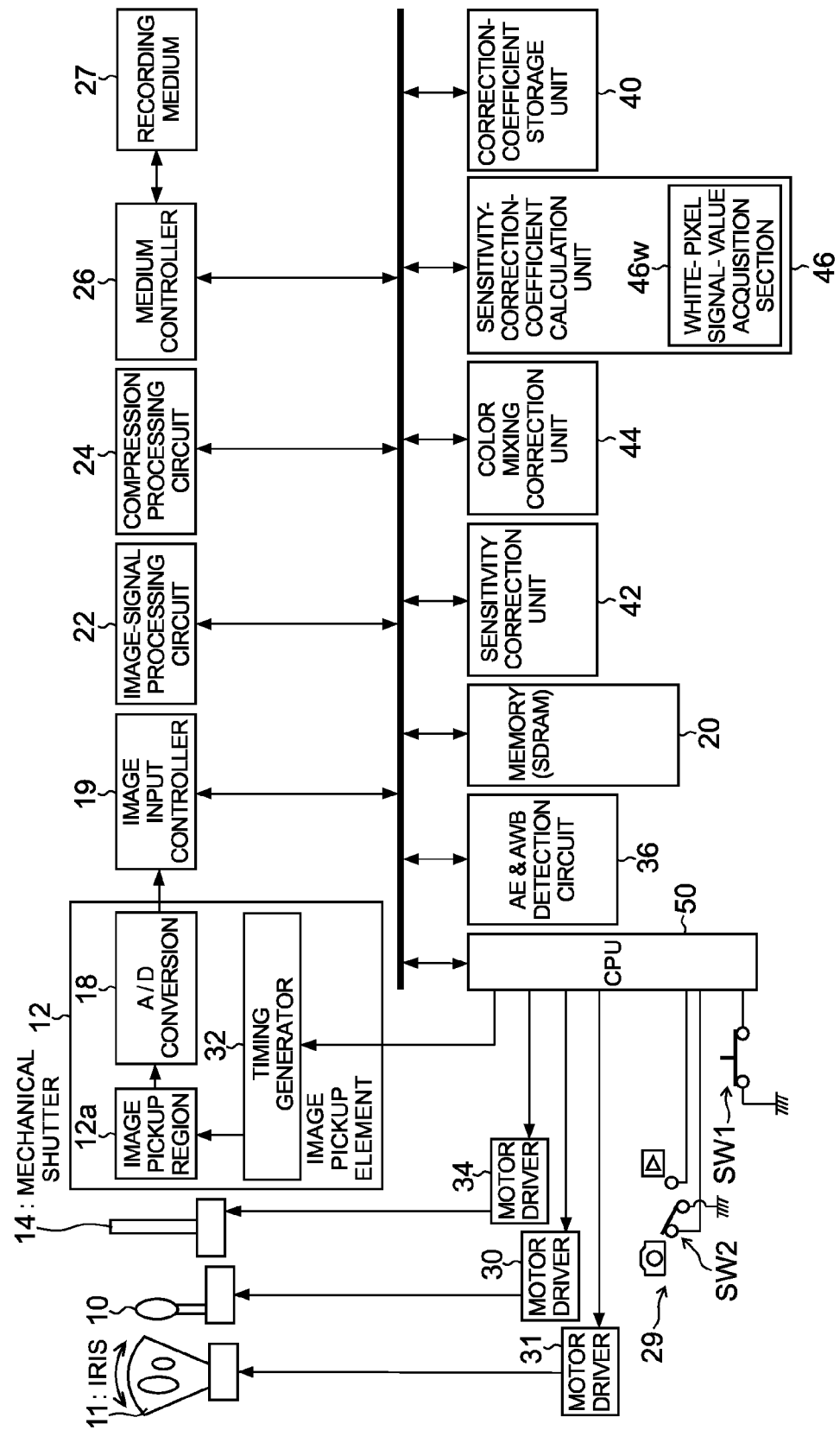
FIG. 11 is a block diagram showing an overall configuration of an exemplary image pickup apparatus according to the fourth embodiment.

FIG. 11 is a block diagram of an exemplary image pickup apparatus 100 including the image pickup element 12 in FIG. 10. The image pickup apparatus 100 includes a sensitivity-correction-coefficient calculation unit 46 similarly to the image pickup apparatus 100 in FIG. 7, but differs from the image pickup apparatus 100 according to the third embodiment shown in FIG. 7, in that the sensitivity-correction-coefficient calculation unit 46 includes therein a white-pixel signal-value acquisition section 46*w* to acquire the signal values of white pixels from a picked-up image stored in the memory 20. In the following, only the difference from the third embodiment is described.

Figure 12:
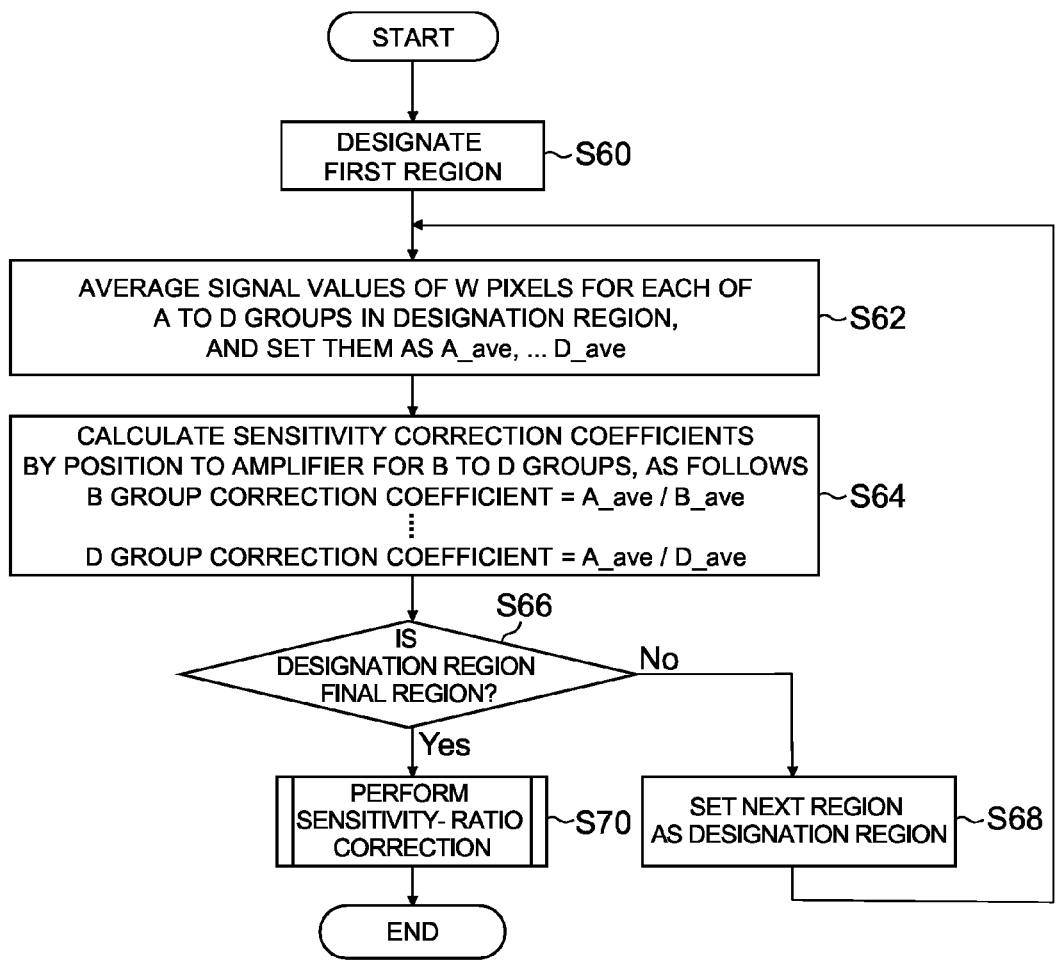
FIG. 12 is a flowchart showing a flow of an exemplary color-mixing correction process according to the fourth embodiment.

FIG. 12 is a flowchart showing a flow of an exemplary correction process according to the fourth embodiment. The process is executed according to a program under the control of the CPU 50 in FIG. 11.

First, the CPU 50 designates a first region (step S60).

Next, the sensitivity-correction-coefficient calculation unit 46 acquires the signal values of the white pixels from a picked-up image stored in the memory 20, and averages the signal values of the W (white) pixels for each pixel group of the A to D groups (four groups) in the designation region, and sets them as A_ave, B_ave, C_ave and D_ave respectively (step S62). The A to D groups are an upper-left pixel group, an upper-right pixel group, a lower-left pixel group and a lower-right pixel group, respectively.

Next, the sensitivity-correction-coefficient calculation unit 46 calculates correction coefficients, A_ave/B_ave, A_ave/C_ave and A_ave/D_ave, for sensitivity ratios caused by the amplifier sharing structures of the B to D groups (step S64).

Next, the CPU 50 determines whether the designation region is the final region in the correction coverage (step S66), and, in the case of not being the final region (in step S66, No), sets the next region as the designation region to repeat steps S62 to S64 (step S68).

After determining the sensitivity-ratio correction coefficients in all designation regions, the CPU 50 performs a sensitivity-ratio correction (step S70). This sensitivity-ratio correction is the same as the process according to the first embodiment, which has been previously described with reference to FIG. 4, and descriptions thereof are omitted here. The color-mixing correction according to the first embodiment shown in FIG. 5 may be performed together.

The white pixel can be regarded as being substantially equivalent to a pixel on which a color filter is not provided, and yields the sensitivity ratio caused only by the amplifier sharing structure. Therefore, it is possible to accurately separate the sensitivity ratio caused by the color filters and the sensitivity ratio caused by the amplifier sharing structure. In addition, since the white pixel has a higher sensitivity than a pixel on which a color filter is provided, it is easy to secure the accuracy of correction coefficients.

In the present invention, the "white color filter" is not particularly limited to a case in which a color filter exhibits a white color, and a case in which a color filter is not provided (a case of no color filter). Examples of the "white color filter" include an achromatic color filter. The "white color filter" may be a filter that is roughly transparent relative to visible light (for example, a transmittance of 80% or more).

Although the case in which the white pixel is used as one of the color pixels has been described in the above example, the number of white pixels may be reduced by thinning. In that case, it is possible to shorten a calculation time.

<Variation in Sharing Structure Patterns>

In the above first to fourth embodiments, as shown in FIG. 3, FIG. 6 and the like, the image pickup elements 12 in which the same type of sharing structure patterns CP are repeatedly arranged has been described as an example. However, the present invention is not limited to such a case. It is allowable to be an image pickup element 12 in which multiple types of sharing structure patterns differing in pixel arrangement patterns are repeatedly arranged.

Figure 13:
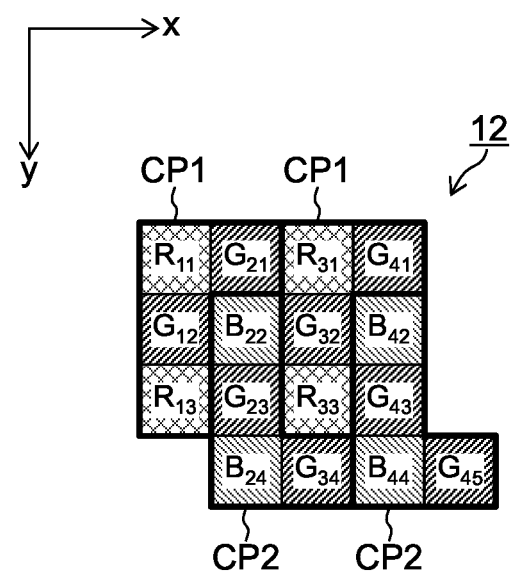
FIG. 13 is a diagram showing another exemplary sharing structure pattern.

FIG. 13 shows a part of an exemplary image pickup element 12 in which multiple types (multiple sets) of sharing structure patterns CP1 and CP2 differing in pixel arrangement patterns are repeatedly arranged. In FIG. 13, "R", "B" and "G" indicate that the color of the color filter is red, blue and green, respectively. The first sharing structure pattern CP1 includes an upper-left pixel R11, a middle-left pixel G12, a lower-left pixel R13 and an upper-right pixel G21. The second sharing structure pattern CP2 includes an upper-left pixel B22, a middle-left pixel G23, a lower-left pixel B24 and a lower-right pixel G34. Then, the two types of sharing structure patterns CP1 and CP2 differing in pixel arrangement patterns are repeatedly arranged in the horizontal direction x and the vertical direction y.

The sensitivity correction unit 42 and the color-mixing correction unit 44 performs a correction of the signal value depending on the relative position of the pixel 62 to the shared amplifier 66, for each of the multiple types of sharing structure patterns CP1 and CP2.

In the present invention, the number of the types of different sharing structure patterns is not limited to two sets.

[Various Examples of Color Filter Arrays]

In the following, various examples of color filter arrays are described in detail.

(First Example of Color Filter Array)

Figure 14:
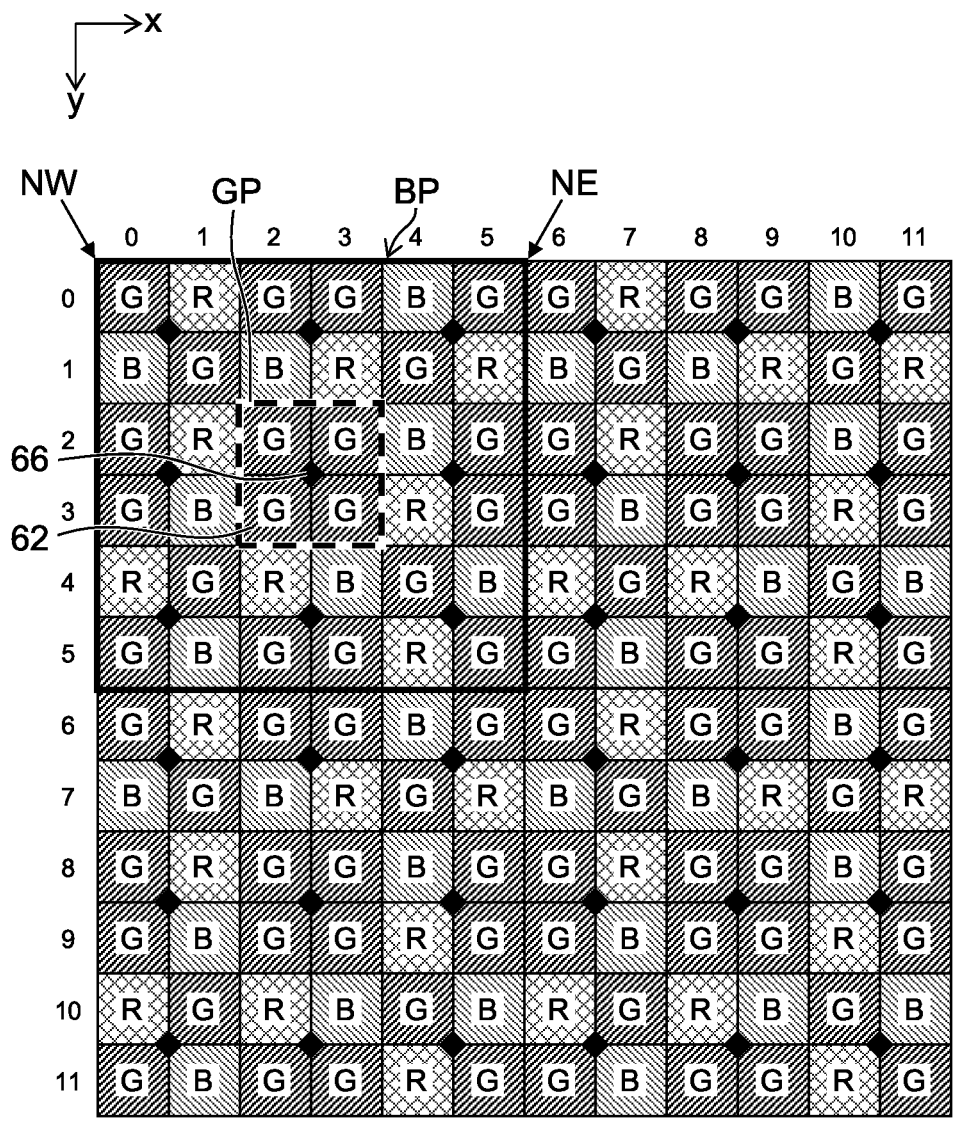
FIG. 14 is a diagram showing a color filter array according to a first example.

A color filter array according to a first example is shown in FIG. 14.

FIG. 14 shows an example of an array of the color filters 64 provided in the image pickup element 12 (hereinafter, referred to as a "color filter array"). On each pixel, any one of three types of primary color filters of red (R), green (G) and blue (B) is arranged.

Here, the pixels 62 including the photoelectric conversion elements are hidden by the color filters 64 and the amplifiers 66 also are hidden by the color filters 64 so that the amplifiers 66 cannot be seen actually, but in FIG. 14, the amplifiers 66 are drawn in perspective in order to discriminate the sharing structure for the amplifiers 66.

The color filter array shown in FIG. 14 has the following first to third features.

(First feature) In the color filter array shown in FIG. 14, a basic array pattern BP (a pattern shown by the thick-bordered frame), in which three color types (R, G and B) of color filters 64 are mixedly arrayed in a square array (in the example, horizontally six color filters and vertically six color filters), is repeatedly arranged in the horizontal direction x and the vertical direction y. That is, in this color filter array, each color filter of R, G and B (R filter, G filter and B filter) is arrayed with a predetermined period.

Thus, the R filter, G filter and B filter are arrayed with a predetermined period, and therefore, when performing a synchronization (interpolation) process (also called a demosaic process) of R, G and B signals read from the image pickup element, it is possible to perform the process according to the repeated pattern.

(Second feature) The arrangement period (6×6) of the basic array pattern BP is three fold in both the horizontal direction x and the vertical direction y, compared to the arrangement period (2×2) of a sharing structure CP constituted by a shared amplifier 66 and 2×2 pixels. The basic array pattern BP includes therein at least one same-color square-array pattern GP constituted by 2×2 color filters 64 that respectively correspond to the 2×2 pixels in the amplifier sharing structure (sharing square-array pattern) and that have the same color. That is, the basic array pattern BP includes therein the 2×2 color filters (the color filters in the same-color square-array pattern GP) whose positions coincide with the positions of the 2×2 pixels in the amplifier sharing structure in both the horizontal direction x and the vertical direction y.

Thus, the basic array pattern BP includes therein the color filters in the same-color square-array pattern GP whose positions coincide with the positions of the 2×2 pixels in the sharing structure in both the horizontal direction x and the vertical direction y, and therefore, it is possible to easily detect the sensitivity difference caused by the amplifier sharing structure, based on the signal values of the 2×2 pixels corresponding to the same-color square-array pattern GP.

A third feature will be described. In FIG. 14, if focusing on each of the plurality of colors (R, G and B) in the basic array pattern BP, then for each color, one or more color filters are arranged on each line in the horizontal direction x and vertical direction y in the basic array pattern BP. For example, as for the "G" color filter (hereinafter, merely referred to as "G"), one or more color filters are arranged on each line of x=0 to 5 to the horizontal direction and on each line of y=0 to 5 to the vertical direction y, in the basic array pattern BP. Similarly, as for the "R" color filter (hereinafter, merely referred to as "R"), one or more color filters are arranged on each line of x=0 to 5 to the horizontal direction x and on each line of y=0 to 5 to the vertical direction y, in the basic array pattern BP. Similarly, as for the "B" color filter (hereinafter, merely referred to as "B"), one or more color filters are arranged on each line of x=0 to 5 to the horizontal direction x and on each line of y=0 to 5 to the vertical direction y, in the basic array pattern BP. By this feature, it is possible to suppress an occurrence of color moire (false color).

A fourth feature will be described. In FIG. 14, in the plurality of color filters, if focusing on each of the plurality of colors (R, G and B), there is such a line that color filters with the same color are arranged on the same line at two or more types of arrangement intervals, in both the horizontal direction x and the vertical direction y. For example, if focusing on "G" on the horizontal line of y=0 (the topmost horizontal line in the figure), the interval between the "G" at the coordinates (0, 0) and the "G" at the coordinates (2, 0) is two pixels, and the interval between the "G" at the coordinates (2, 0) and the "G" at the coordinates (3, 0) is one pixel. The same goes for the horizontal lines of y=2, 3 and 5. If focusing on "B" on the horizontal line of y=1 (the second top horizontal line in the figure), the interval between the "B" at the coordinates (0, 1) and the "B" at the coordinates (2, 1) is two pixels, and the interval between the "B" at the coordinates (2, 1) and the "B" at the coordinates (6, 1) is four pixels. If focusing on "R" on the same horizontal line of y=1, the interval between the "R" at the coordinates (3, 1) and the "R" at the coordinates (5, 1) is two pixels, and the interval between the "R" at the coordinates (5, 1) and the "R" at the coordinates (9, 1) is four pixels. The same goes for the horizontal line of y=4. Also, the same goes if focusing on each color on the vertical lines. Such lines exist in both the horizontal direction x and the vertical direction y, at least, at intervals not greater than the repetition period (six pixels in the horizontal direction x, six pixels in the vertical direction) of the basic array pattern BP. By this feature, it is possible to suppress an occurrence of geometric noise in a periodic pattern.

A fifth feature will be described. In the basic array pattern BP, the G filters corresponding to luminance pixels are arranged such that a portion including two or more successive G filters is included in each direction of the horizontal direction, the vertical direction, and the diagonal directions (NE and NW).

Since the G filters corresponding to luminance pixels are arranged on lines of the color filter array in the horizontal, vertical and diagonal (NE and NW) directions, it is possible to enhance reproduction accuracy of a synchronization process (demosaic process) in a high-frequency region, without depending on a direction of a high-frequency occurrence.

A sixth feature will be described. In FIG. 14, when defining each of the color filters 64 constituting the same-color square-array pattern GP as the k-th same-color filter (k represents the integers from 1 to 4 that designate the positions relative to the amplifier 66), among the plurality of color filters (clockwise from the direction of 12 o'clock, BRGGGBRG) adjacent to the first same-color filter (the "G" at the upper left relative to the amplifier 66), the plurality of color filters (clockwise from the direction of 3 o'clock, BRGGGBRG) adjacent to the second same-color filter (the "G" at the upper right relative to the amplifier 66), the plurality of color filters (clockwise from the direction of 6 o'clock, BRGGGBRG) adjacent to the third same-color filter (the "G" at the lower left relative to the amplifier 66), and the plurality of color filters (clockwise from the direction of 9 o'clock, BRGGGBRG) adjacent to the fourth same-color filter (the "G" at the lower right relative to the amplifier 66), the color combination (RGB) and the number for each color (two Rs, four Gs and two Bs) are common. In the example, whichever same-color filter is focused on, the adjacent color filters are arrayed in clockwise order: BRGGGBRG, in an identical same-color square-array pattern. That is, any same-color filter is surrounded by the color filters sequenced in the common color array.

Figure 15:
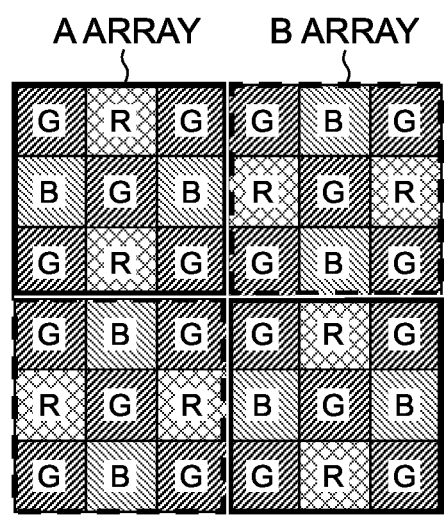
FIG. 15 is an explanatory diagram for explaining a basic array pattern in the color filter array according to the first example.

FIG. 15 shows a diagram relevant to a state in which the basic array pattern BP shown in FIG. 14 is partitioned into four sets of 3×3 pixels. As shown in FIG. 15, the basic array pattern BP can be regarded as an array in which the A array of 3×3 pixels surrounded by the full-line frame, and the B array of 3×3 pixels surrounded by the broken-line frame are alternately arranged in the horizontal direction and the vertical direction. In each of the A array and the B array, G filters, which are luminance pixels, are arranged at the four corners, at the center and on both diagonal lines. In the A array, B filters are arrayed in the horizontal direction and R filters are arrayed in the vertical direction, across the G filter at the center. On the other hand, in the B array, R filters are arrayed in the horizontal direction and B filters are arrayed in the vertical direction, across the G filter at the center. That is, in the A array and the B array, the positional relationship between R filters and B filters is reversed, but the other arrangements are common.

The basic array pattern BP shown in FIG. 14 is point-symmetrical with respect to the center of the basic array pattern (the center in the four G filters). Also, as shown in FIG. 15, each of the A array and the B array in the basic array pattern is point-symmetrical with respect to the G filter at the center, and is top-bottom and left-right symmetrical (line-symmetrical). Furthermore, as shown in FIG. 14, G filters are arranged on each of the diagonal lines (NE and NW) in the color filter array, and therefore, the color filter array of the image pickup element 12 has a feature that makes it possible to further enhance reproduction accuracy of a synchronization process in a high-frequency region.

(Second Example of Color Filter Array)

Figure 16:
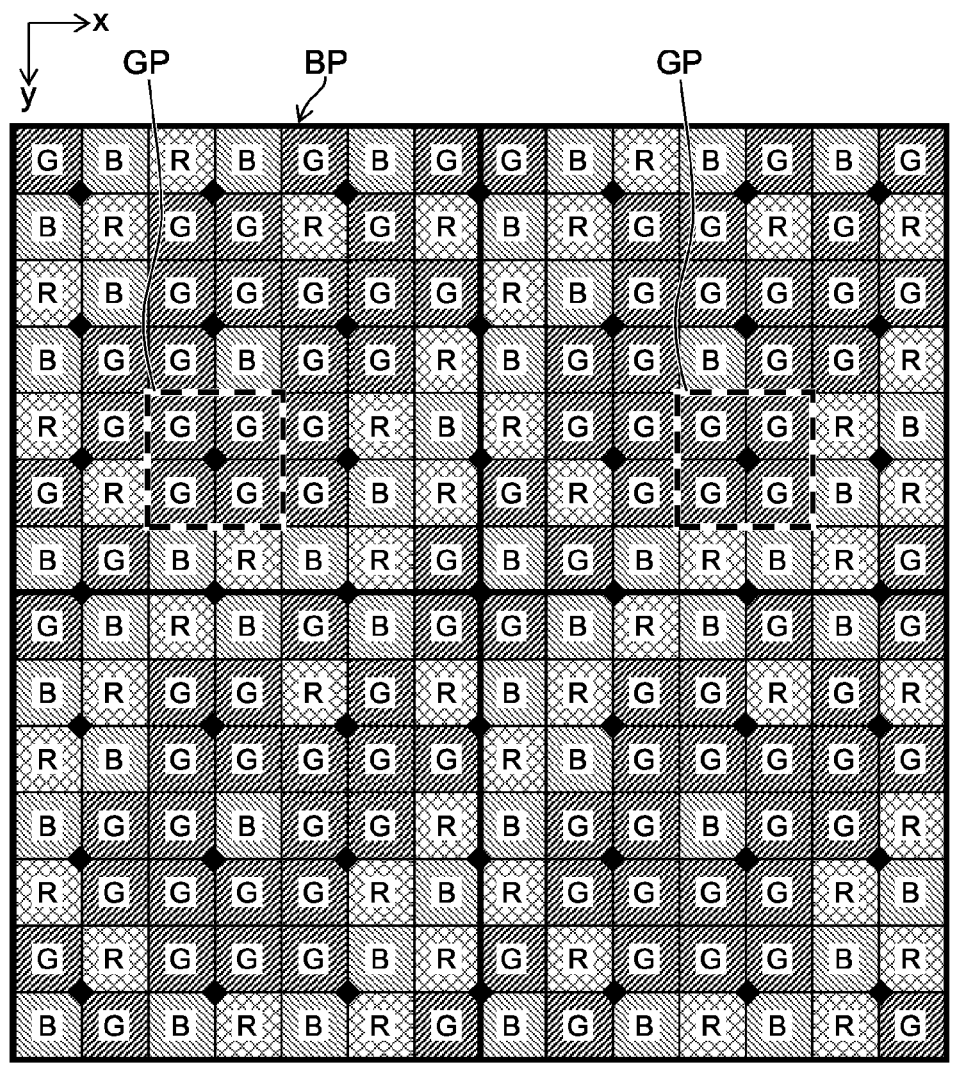
FIG. 16 is a diagram showing a color filter array according to a second example.

FIG. 16 shows a second example of a color filter array of the image pickup element.

As shown in FIG. 16, this color filter array includes a basic array pattern BP that is a square array pattern of 7×7 pixels (a pattern shown by the thick-bordered frame), and this basic array pattern BP is repeatedly arranged in the horizontal direction and the vertical direction. That is, in this color filter array, similarly to the color filter array according to the first example shown in FIG. 14, each color filter of R, G and B (R filter, G filter and B filter) is arrayed with a predetermined period (the first feature).

The basic array pattern BP includes therein 2×2 color filters (color filters in a same-color square-array pattern GP) whose positions coincide with the positions of the 2×2 pixels in the amplifier sharing structure in both the horizontal direction x and the vertical direction y (the second feature).

However, in the basic array pattern BP according to the example, an odd number of color filters are arranged in both the horizontal direction x and the vertical direction y. Thereby, the same-color patterns of 2×2 Gs are arranged such that the positions deviate from each other by an odd number of pixels (in the example, one pixel) in both the horizontal direction x and the vertical direction y.

The four pixels in the same-color pattern of 2×2 may be arranged so as to deviate in both the horizontal direction x and the vertical direction y. That is, the four pixels in the same-color pattern of 2×2 are only necessary to be arranged such that they are at four types of positions of (2n, 2m), (2n+1, 2m), (2n, 2m+1) and (2n+1, 2m+1). In other words, the four same-color filters of 2×2 are only necessary to be at four different positions relative to the amplifier 66.

Thus, multiple same-color square-array patterns GP are arranged so as to deviate from each other by an odd number of pixels, and therefore, it is possible to provide basic array patterns BP each of which necessarily includes one or more same-color square-array patterns GP matching with the sharing structure pattern (CP in FIG. 2) in which the amplifier 66 is shared. By measuring the signal value of each pixel in the same-color square-array pattern GP, it is possible to adequately measure and correct the variation in characteristics caused by the positions of the pixels relative to the amplifier 66.

In the above examples, the image pickup element with three color types of color filters of primary colors, RGB, or four color types of color filters of RGBW has been described. However, the present invention is not limited to this, and can be applied to an image pickup element with four color types of color filters that have three primary colors, RGB, and another color (for example, emerald (E)).

In addition, the present invention can be applied to an image pickup element with four color types of complementary color filters that have cyan (C), magenta (M) and yellow (Y), which are complementary colors for primary colors RGB, along with G.

So far, the case in which multiple pixels share only an amplifier (amplifying element) has been described as an example. However, it goes without saying that the present invention can be applied to a case of another circuit element if it involves a sharing structure causing sensitivity difference. The sensitivity correction in such a case is also comprehended in the present invention.

Only the case in which the basic array pattern BP is constituted by 6×6 filters or 7×7 filters is shown in the figures. However, it goes without saying that other filter numbers (8×8, 9×9, . . . ) are also allowable. Furthermore, the color filter array in a basic array pattern is not limited to an N×N square array, and the present invention can be applied to a basic array pattern with an N×M array. Here, in view of ease of image processes such as a synchronization process (demosaic process) and a thinning process in taking a moving image, it is preferable that N and M be 10 or less.

The present invention is not limited to the examples described in the specification and the examples shown in the drawings, and naturally, various design modifications and improvements may be made without departing from the spirit of the present invention.

What is claimed is:

1. An image pickup apparatus comprising:
   an image pickup element in which a plurality of color filters are respectively arranged on a plurality of pixels arrayed two-dimensionally in a horizontal direction and a vertical direction, each of the pixels including a photoelectric conversion element;

a storage device that stores information for correcting a signal value of each of the pixels of the image pickup element; and a correction device that corrects the signal value of each of the pixels of the image pickup element using the information stored in the storage device, wherein the plurality of the pixels of the image pickup element share a specific circuit element on a multiple-pixel basis, the plurality of the color filters of the image pickup element are arranged such that a basic array pattern is repeated in the horizontal direction and the vertical direction, the basic array pattern mixedly including three or more color types of the color filters and having an arrangement period different from an arrangement period of a sharing structure pattern including the specific circuit element and the multiple pixels, the storage device stores a plurality of first correction coefficients and a plurality of second correction coefficients, the plurality of the first correction coefficients respectively corresponding to colors of the plurality of the color filters of the image pickup element, the plurality of the second correction coefficients respectively corresponding to a plurality of relative positions of the pixels to a position of the specific circuit element of the image pickup element, and when the correction device targets each of the plurality of the pixels of the image pickup element and corrects the signal value of each pixel of interest, the correction device selects a first correction coefficient corresponding to the color of the color filter on the pixel of interest from the plurality of the first correction coefficients stored in the storage device, selects a second correction coefficient corresponding to the relative position of the pixel of interest from the plurality of the second correction coefficients stored in the storage device, and performs a calculation with the selected first correction coefficient and the selected second correction coefficient, with respect to the signal value of the pixel of interest.

2. The image pickup apparatus according to claim 1, wherein the storage device stores a sensitivity-ratio correction coefficient for correcting a sensitivity ratio among the pixels, and a color-mixing correction coefficient for correcting a color mixing of the color filter on an adjacent pixel that is adjacent to each of the pixels, the sensitivity-ratio correction coefficient and the color-mixing correction coefficient including the first correction coefficient and the second correction coefficient, and the correction device performs a calculation with the first correction coefficient and the second correction coefficient for one of the sensitivity-ratio correction coefficient and the color-mixing correction coefficient, with respect to the signal value of the pixel of interest, and then performs a calculation with the first correction coefficient and the second correction coefficient for the other of the sensitivity-ratio correction coefficient and the color-mixing correction coefficient, with respect to the calculation result.

3. The image pickup apparatus according to claim 1, wherein, as the plurality of the first correction coefficients, the storage device stores as many first correction coefficients as types of the color filters of the image pickup element, the types of the color filters being different from each other in spectral characteristic.

4. The image pickup apparatus according to claim 1, wherein, as the plurality of the second correction coefficients, the storage device stores as many second correction coefficients as the pixels existing in one unit of the sharing structure pattern of the image pickup element.

5. The image pickup apparatus according to claim 1, further comprising a correction-coefficient calculation device that calculates the second correction coefficient, the correction-coefficient calculation device calculating the second correction coefficient by comparing the signal values among the pixels that have different relative positions to the position of the specific circuit element, wherein the storage device stores the second correction coefficient calculated by the correction-coefficient calculation device.

6. The image pickup apparatus according to claim 5, wherein, in a whole or a part of a picked-up image generated by the image pickup element, the correction-coefficient calculation device calculates the second correction coefficient by calculating an average value of the signal values of a plurality of the same color pixels over a plurality of the sharing structure patterns, for each of the relative positions to the position of the specific circuit element, and comparing the average values among the relative positions that are different from each other.

7. The image pickup apparatus according to claim 6, wherein the image pickup element includes a white color filter in the basic array pattern, and the correction-coefficient calculation device calculates the second correction coefficient by averaging the signal values of the pixels corresponding to the white color filter over a plurality of the basic array patterns.

8. The image pickup apparatus according to claim 1, wherein multiple types of the sharing structure patterns are repeatedly arranged in the image pickup element, the multiple types of the sharing structure patterns being different from each other in arrangement pattern of the pixels, and the correction device corrects the signal value depending on the relative position of the pixel to the position of the specific circuit element, for each of the multiple types of the sharing structure patterns.

9. A signal value correction method to correct a signal value of each pixel of an image pickup element in which a plurality of color filters are respectively arranged on a plurality of pixels arrayed two-dimensionally in a horizontal direction and a vertical direction, each of the pixels including a photoelectric conversion element, wherein the plurality of the pixels of the image pickup element share a specific circuit element on a multiple-pixel basis, the plurality of the color filters of the image pickup element are arranged such that a basic array pattern is repeated in the horizontal direction and the vertical direction, the basic array pattern mixedly including three or more color types of the color filters and having an arrangement period different from an arrangement period of a sharing structure pattern including the specific circuit element and the multiple pixels, and the method comprises, previously storing a plurality of first correction coefficients and a plurality of second correction coefficients in a storage device, the plurality of the first correction coefficients respectively corresponding to colors of the plurality of the color filters of the image pickup element, the plurality of the second correction coefficients respectively corresponding to a plurality of relative positions of the pixels to a position of the specific circuit element of the image pickup element; and, when targeting each of the plurality of the pixels of the image pickup element and correcting the signal value of each pixel of interest, selecting a first correction coefficient corresponding to the color of the color filter on the pixel of interest from the plurality of the first correction coefficients, selecting a second correction coefficient corresponding to the relative position of the pixel of interest from the plurality of the second correction coefficients, and performing a calculation with the selected first correction coefficient and the selected second correction coefficient, with respect to the signal value of the pixel of interest.

10. The signal value correction method according to claim 9, wherein the method comprises storing a sensitivity-ratio correction coefficient for correcting a sensitivity ratio among the pixels, and a color-mixing correction coefficient for correcting a color mixing of the color filter on an adjacent pixel that is adjacent to each of the pixels, in the storage device, the sensitivity-ratio correction coefficient and the color-mixing correction coefficient including the first correction coefficient and the second correction coefficient; and performing a calculation with the first correction coefficient and the second correction coefficient for one of the sensitivity-ratio correction coefficient and the color-mixing correction coefficient, with respect to the signal value of the pixel of interest, and then performing a calculation with the first correction coefficient and the second correction coefficient for the other of the sensitivity-ratio correction coefficient and the color-mixing correction coefficient, with respect to the calculation result.

11. The signal value correction method according to claim 9, wherein the method comprises calculating the second correction coefficient by comparing the signal values among the pixels that have different relative positions to the position of the specific circuit element, and storing the calculated second correction coefficient in the storage device.

12. The signal value correction method according to claim 11, wherein, in a whole or a part of a picked-up image generated by the image pickup element, the method comprises calculating the second correction coefficient by calculating an average value of the signal value of a plurality of the same color pixels over a plurality of the sharing structure patterns, for each of the relative positions to the position of the specific circuit element, and comparing the average values among the relative positions that are different from each other.

13. The signal value correction method according to claim 12, wherein the image pickup element includes a white color filter in the basic array pattern, and the method comprises calculating the second correction coefficient by averaging the signal values of the pixels corresponding to the white color filter over a plurality of the basic array patterns.

* * * * *